(12) United States Patent
Kan et al.

(10) Patent No.: US 11,951,438 B2
(45) Date of Patent: Apr. 9, 2024

(54) LIQUID FUEL SYNTHESIS SYSTEM

(71) Applicant: NGK Insulators, Ltd., Nagoya (JP)

(72) Inventors: Hirofumi Kan, Nagoya (JP); Atsushi Torii, Handa (JP); Kazuki Iida, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 18/146,610

(22) Filed: Dec. 27, 2022

(65) Prior Publication Data

US 2023/0135426 A1  May 4, 2023

Related U.S. Application Data

(63) Continuation of application No. PCT/JP2022/023059, filed on Jun. 8, 2022.

(30) Foreign Application Priority Data

Jun. 8, 2021 (JP) .................................. 2021-095824

(51) Int. Cl.
*B01D 53/22* (2006.01)
*B01D 61/36* (2006.01)
(Continued)

(52) U.S. Cl.
CPC ............. *B01D 53/22* (2013.01); *B01D 61/36* (2013.01); *B01D 63/06* (2013.01); *C01B 3/503* (2013.01); *C01B 2203/0405* (2013.01)

(58) Field of Classification Search
CPC ........ B01D 63/06; B01D 53/22; B01D 61/36; C01B 3/503; C01B 2203/0405
See application file for complete search history.

(56) References Cited

U.S. PATENT DOCUMENTS 4,147,754 A * 4/1979 Ward, III ............. B01D 53/229
423/232
6,298,664 B1 * 10/2001 Asen et al. ............... F23L 7/00
60/671
(Continued)

FOREIGN PATENT DOCUMENTS

CN     112657435 A    4/2021
JP     2007-055970 A    3/2007
(Continued)

OTHER PUBLICATIONS

Robinson "Water desalination using a temperature gradient" Desalination 464 (2019)1-7 (Year: 2019).*
(Continued)

*Primary Examiner* — Anthony R Shumate
(74) *Attorney, Agent, or Firm* — BURR PATENT LAW, PLLC

(57) ABSTRACT

A liquid fuel synthesis system includes a liquid fuel synthesis portion and a sweep gas supply unit. The liquid fuel synthesis portion is partitioned into a non-permeation side space and a permeation side space by the separation membrane. A temperature of the sweep gas flowing into the permeation side space is higher than at least one of a temperature of the raw material gas flowing into the non-permeation side space and a temperature of a first outflow gas flowing out of the non-permeation side space. A temperature of a second outflow gas flowing out of the permeation side space is higher than at least one of the temperature of the raw material gas flowing into the non-permeation side space and the temperature of the first outflow gas flowing out of the non-permeation side space.

8 Claims, 10 Drawing Sheets

(51) Int. Cl.
    *B01D 63/06*     (2006.01)
    *C01B 3/50*     (2006.01)

(56) References Cited

U.S. PATENT DOCUMENTS

| | | | |
|---|---|---|---|
| 11,407,659 B1* | 8/2022 | Abdulrahim | B01D 61/002 |
| 2004/0047799 A1* | 3/2004 | Randhava | C01B 3/501 |
| | | | 423/652 |
| 2006/0248800 A1* | 11/2006 | Miglin | B01J 8/0278 |
| | | | 48/198.3 |
| 2010/0077766 A1* | 4/2010 | Panuccio | C01B 3/501 |
| | | | 60/780 |
| 2013/0032538 A1* | 2/2013 | Iyer | B01D 61/002 |
| | | | 210/648 |
| 2013/0240444 A1* | 9/2013 | Jung | C08G 69/42 |
| | | | 562/556 |
| 2016/0229714 A1* | 8/2016 | Thiel | B01D 5/006 |
| 2017/0335203 A1 | 11/2017 | Al-Shammari et al. | |
| 2018/0079658 A1* | 3/2018 | Gershon | B01D 1/0035 |
| 2021/0060488 A1* | 3/2021 | Wilson | C02F 1/02 |

FOREIGN PATENT DOCUMENTS

| | | |
|---|---|---|
| JP | 2018-008940 A | 1/2018 |
| JP | 2018-505231 A | 2/2018 |
| JP | 2020-024917 A | 2/2020 |
| WO | WO-2016201498 A1 * 12/2016 | ........... B01D 61/002 |

OTHER PUBLICATIONS

English translation of the Written Opinion of the International Searching Authority (Application No. PCT/JP2022/023059) dated Oct. 16, 2023.

International Search Report and Written Opinion (Application No. PCT/JP2022/023059) dated Jul. 12, 2022.

Chinese Office Action (with English translation) dated Jan. 2, 2024 (Application No. 202280003787.X).

* cited by examiner

LIQUID FUEL SYNTHESIS SYSTEM

CROSS-REFERENCE TO RELATED APPLICATION

This is a continuation of PCT/JP2022/23059, filed Jun. 8, 2022, which claims priority from Japanese Application No. 2021-095824, filed Jun. 8, 2021 the entire contents of which are hereby incorporated by reference.

TECHNICAL FIELD

The present invention relates to a liquid fuel synthesis system.

BACKGROUND ART

In recent years, liquid fuel synthesis systems have been developed that can improve, in a conversion reaction of a raw material gas containing hydrogen and carbon oxide (carbon monoxide, carbon dioxide, or the like) to a liquid fuel (a fuel such as methanol that is in a liquid state at normal temperature and pressure), conversion efficiency by separating water vapor which is a by-product.

JP 2018-008940A discloses a liquid fuel synthesis system including a membrane reactor, a raw material gas supply unit, and a sweep gas supply unit. The membrane reactor includes a catalyst for promoting the conversion reaction of a raw material gas containing carbon dioxide and hydrogen into methanol, and a separation membrane permeable to water vapor which is a by-product of the conversion reaction. The raw material gas supply unit supplies the raw material gas to a non-permeation side of the separation membrane. The sweep gas supply unit supplies a sweep gas to a permeation side of the separation membrane. Water vapor that has permeated through the separation membrane is discharged from the membrane reactor together with the sweep gas.

SUMMARY

However, in the liquid fuel synthesis system described in JP 2018-008940A, the pressure and temperature of the water vapor permeating through the separation membrane are reduced, and relative humidity on the permeation side of the separation membrane increases, which may reduce durability of the separation membrane. Such problems are significant if the separation membrane is easily decomposed in a high temperature and high humidity environment.

The present invention has been made in view of the above circumstances, and an object of the present invention is to provide a liquid fuel synthesis system capable of suppressing reduction in durability of the separation membrane.

A liquid fuel synthesis system according to a first aspect includes a liquid fuel synthesis portion and a sweep gas supply unit. The liquid fuel synthesis portion has a separation membrane permeable to water vapor which is a by-product of a conversion reaction of a raw material gas containing hydrogen and carbon oxide to a liquid fuel. The liquid fuel synthesis portion is partitioned into a non-permeation side space and a permeation side space by the separation membrane. The sweep gas supply unit is configured to supply the permeation side space with a sweep gas for sweeping the water vapor permeating through the separation membrane. A temperature of the sweep gas flowing into the permeation side space is higher than at least one of a temperature of the raw material gas flowing into the non-permeation side space and a temperature of a first outflow gas flowing out of the non-permeation side space. A temperature of a second outflow gas flowing out of the permeation side space is higher than at least one of the temperature of the raw material gas flowing into the non-permeation side space and the temperature of the first outflow gas flowing out of the non-permeation side space.

A liquid fuel synthesis system according to a second aspect includes a liquid fuel synthesis portion and a sweep gas supply unit. The liquid fuel synthesis portion has a separation membrane permeable to a liquid fuel which is a product of a conversion reaction of a raw material gas containing hydrogen and carbon oxide to the liquid fuel, and water vapor which is a by-product of the conversion reaction. The liquid fuel synthesis portion is partitioned into a non-permeation side space and a permeation side space by the separation membrane. The sweep gas supply unit is configured to supply the permeation side space with a sweep gas for sweeping the liquid fuel permeating through the separation membrane. A temperature of the sweep gas flowing into the permeation side space is higher than at least one of a temperature of the raw material gas flowing into the non-permeation side space and a temperature of a first outflow gas flowing out of the non-permeation side space. A temperature of a second outflow gas flowing out of the permeation side space is higher than at least one of the temperature of the raw material gas flowing into the non-permeation side space and the temperature of the first outflow gas flowing out of the non-permeation side space.

In the liquid fuel synthesis system of a third aspect according to the first or second aspect, the temperature of the sweep gas flowing into the permeation side space is 150° C. or higher and 450° C. or lower.

In the liquid fuel synthesis system of a fourth aspect according to the first or second aspect, the temperature of the sweep gas flowing into the permeation side space is 160° C. or higher and 400° C. or lower.

In the liquid fuel synthesis system of a fifth aspect according to any one of the first to fourth aspects, the temperature of the raw material gas flowing into the non-permeation side space is 140° C. or higher and 350° C. or lower.

According to the present invention, it is possible to provide a liquid fuel synthesis system capable of suppressing a reduction in durability of the separation membrane.

DESCRIPTION OF EMBODIMENTS

Next, embodiments of the present invention will be described with reference to the drawings. However, the drawings are schematic, and ratio or the like of dimensions may differ from an actual one.

Liquid Fuel Synthesis System 100

Figure 1:
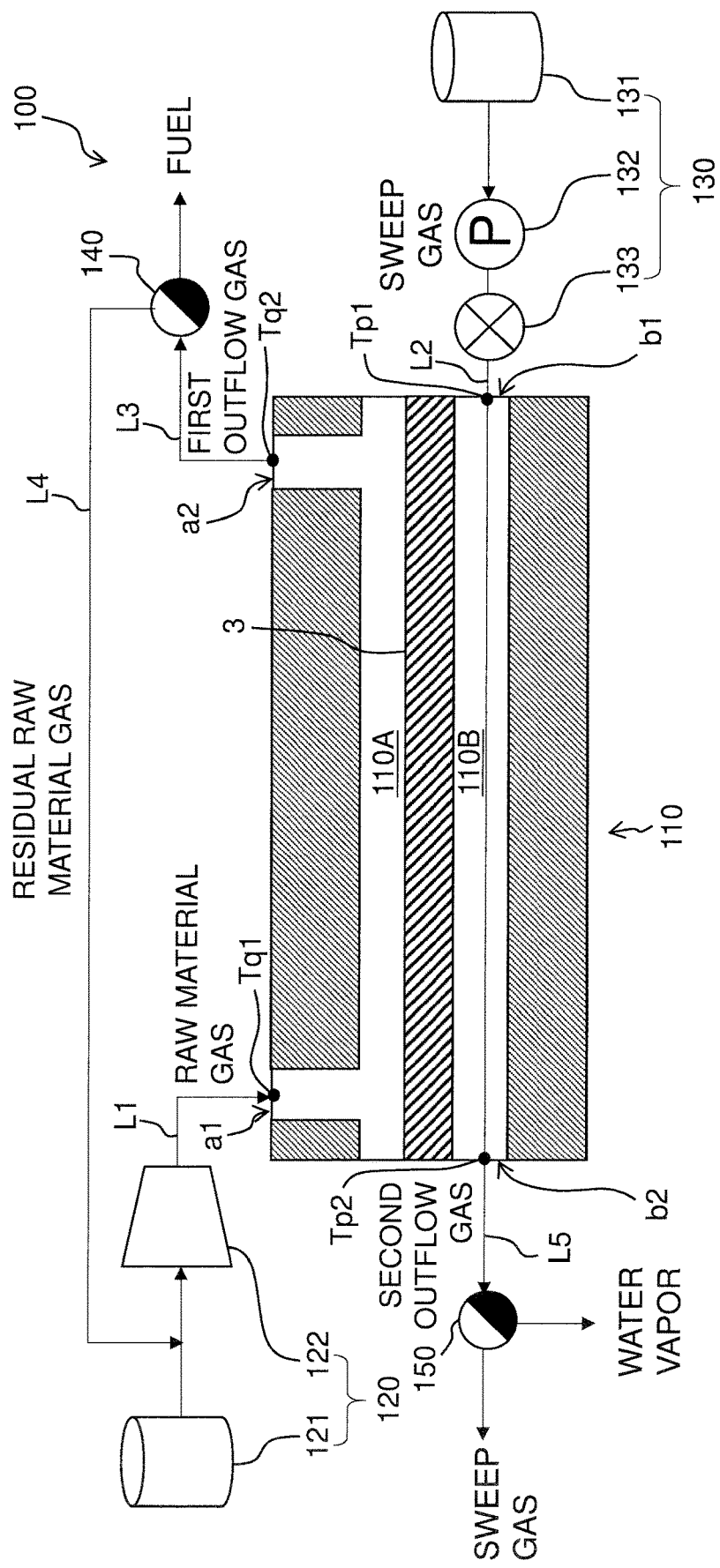
FIG. 1 is a schematic view showing a configuration of a liquid fuel synthesis system according to an embodiment.

FIG. 1 is a schematic view showing a configuration of a liquid fuel synthesis system 100. The liquid fuel synthesis system 100 includes a liquid fuel synthesis portion 110, a raw material gas supply unit 120, a sweep gas supply unit 130, a first drain trap 140, and a second drain trap 150.

The liquid fuel synthesis portion 110 is used to convert the raw material gas to a liquid fuel. The raw material gas contains hydrogen and carbon oxide. The carbon oxide includes, for example, carbon monoxide, carbon dioxide, and mixtures thereof. The liquid fuel may be any fuel that is in a liquid state at normal temperature and pressure, and examples of the liquid fuel include methanol, ethanol, liquid fuels represented by $C_nH_{2(m-2n)}$ (m and n are integers less than 30), and mixtures thereof.

For example, reaction formulas for synthesizing methanol by catalytically hydrogenating a raw material gas containing carbon monoxide, carbon dioxide and hydrogen in the presence of a catalyst are as follows.

$$CO + 2H_2 \Leftrightarrow CH_3OH \qquad (1)$$

$$CO_2 + 3H_2 \Leftrightarrow CH_3OH + H_2O \qquad (2)$$

$$CO_2 + H_2 \Leftrightarrow CO + H_2O \qquad (3)$$

All of the above reactions are equilibrium reactions, and in order to increase both the conversion rate and the reaction rate, it is preferable to carry out the reactions at a high temperature and high pressure (for example, 200° C. or higher and 2 MPa or higher). The liquid fuel is in a gaseous state when it is synthesized, and is kept in a gaseous state at least until it flows out of the liquid fuel synthesis portion 110. The liquid fuel synthesis portion 110 preferably has heat resistance and pressure resistance that correspond to production conditions of the liquid fuel.

The liquid fuel synthesis portion 110 according to the present embodiment has a separation membrane 3, a non-permeation side space 110A, and a permeation side space 110B. The liquid fuel synthesis portion 110 is partitioned by the separation membrane 3 into the non-permeation side space 110A and the permeation side space 110B.

The separation membrane 3 separates water vapor which is a by-product of a conversion reaction in which the raw material gas is converted to the liquid fuel. This allows an equilibrium shift effect to be exploited to further increase the conversion efficiency. By utilizing the equilibrium shift effect, a reaction equilibrium of the above formulas (1) to (3) can be shifted to the product side.

The non-permeation side space 110A is disposed on a non-permeation side of the separation membrane 3. In the non-permeation side space 110A, the conversion reaction of the raw material gas to the liquid fuel proceeds. The raw material gas is supplied from the raw material gas supply unit 120 to the non-permeation side space 110A. The raw material gas flows into the non-permeation side space 110A through an inflow port a1. A first outflow gas containing a synthesized gaseous liquid fuel flows out of the non-permeation side space 110A through an outflow port a2. The first outflow gas flowing out of the outflow port a2 may contain unreacted residual raw material gas in addition to the liquid fuel.

The permeation side space 110B is disposed on a permeation side of the separation membrane 3. The water vapor permeating through the separation membrane 3 flows into the permeation side space 110B. A sweep gas is supplied from the sweep gas supply unit 130 to the permeation side space 110B. The sweep gas flows into the permeation side space 110B through an inflow port b1. A second outflow gas containing the sweep gas and the water vapor flows out of the permeation side space 110B through an outflow port b2.

The raw material gas supply unit 120 has a storage unit 121 and a compressor 122. The storage unit 121 stores the raw material gas. The raw material gas stored in the storage unit 121 is pressurized by the compressor 122 and then supplied to the non-permeation side space 110A of the liquid fuel synthesis portion 110 through a line L1.

The sweep gas supply unit 130 has a storage unit 131, a pump 132, and a heating unit 133. The storage unit 131 stores the sweep gas. Nitrogen gas, air, or the like can be used as the sweep gas. The sweep gas stored in the storage unit 131 is discharged from the pump 132 at a predetermined flow rate, heated by the heating unit 133, and then supplied to the permeation side space 110B of the liquid fuel synthesis portion 110 through a line L2. The heating method in the heating unit 133 is not particularly limited, but if high-temperature raw material gas pressurized by the compressor 122 is used as a heat source, the thermal efficiency of the entire system can be improved.

The first drain trap 140 is disposed downstream of the outflow port a2 of the non-permeation side space 110A. The first outflow gas flowing out from the outflow port a2 flows into the first drain trap 140 through a line L3. The first drain trap 140 liquefies the gaseous liquid fuel contained in the first outflow gas, and separates the residual raw material gas mixed in with the liquid fuel from the liquid fuel. The separated residual raw material gas is returned to the line L1 through a line L4.

The second drain trap 150 is disposed downstream of the outflow port b2 of the permeation side space 110B. The second outflow gas (containing the sweep gas and the water vapor) flowing out of the outflow port b2 flows into the second drain trap 150 through a line L5. The second drain trap 150 separates the sweep gas and water.

Here, a temperature Tp1 of the sweep gas flowing into the permeation side space 110B of the liquid fuel synthesis portion 110 is higher than at least one of a temperature Tq1 of the raw material gas flowing into the non-permeation side space 110A of the liquid fuel synthesis portion 110 and a temperature Tq2 of the first outflow gas flowing out of the non-permeation side space 110A of the liquid fuel synthesis portion 110. Further, a temperature Tp2 of the second outflow gas (containing the sweep gas and the water vapor) flowing out of the permeation side space 110B of the liquid fuel synthesis portion 110 is higher than at least one of the temperature Tq1 of the raw material gas flowing into the non-permeation side space 110A of the liquid fuel synthesis portion 110 and the temperature Tq2 of the first outflow gas flowing out of the non-permeation side space 110A of the liquid fuel synthesis portion 110.

That is, the temperature Tp1 of the sweep gas and the temperature Tp2 of the second outflow gas are each higher than the lower temperature of the temperature Tq1 of the raw material gas and the temperature Tq2 of the first outflow gas.

Thus, since the temperature of the permeation side space 110B can be kept high, a reduction in temperature can be suppressed even if the pressure of the water vapor permeating through the separation membrane 3 is reduced. Therefore, it is possible to suppress an increase in relative humidity on the permeation side of the separation membrane 3, so that a reduction in the durability of the separation membrane 3 can be suppressed.

Such an effect is particularly effective if the separation membrane 3 is easily decomposed in a high temperature and high humidity environment. Being easily decomposed in a high temperature and high humidity environment means that the nitrogen permeability coefficient of the separation membrane 3 is greatly reduced when exposed to a high temperature and high humidity environment. Specifically, being easily decomposed in a high temperature and high humidity environment means that, if the separation membrane 3 is immersed in hot water at 200° C. for 5 hours and then dried (120° C., 5 hours) in an atmosphere, the rate of increase in the nitrogen permeability coefficient (5 MPa nitrogen) of the separation membrane 3 before and after immersion is 10% or more.

The temperature Tp1 of the sweep gas is obtained by a temperature measuring device disposed at the inflow port b1 of the permeation side space 110B. The temperature Tp2 of the second outflow gas is obtained by a temperature measuring device disposed at the outflow port b2 of the permeation side space 110B. The temperature Tq1 of the raw material gas is obtained by a temperature measuring device disposed at the inflow port a1 of the non-permeation side space 110A. The temperature Tq2 of the first outflow gas is obtained by a temperature measuring device disposed at the outflow port a2 of the non-permeation side space 110A.

The temperature Tp1 of the sweep gas and the temperature Tp2 of the second outflow gas can be adjusted by controlling an amount of heat imparted to the sweep gas by the heating unit 133 described above. The temperature Tp1 of the sweep gas and the temperature Tp2 of the second outflow gas may be appropriately set to be higher than the temperature Tq1 of the raw material gas or the temperature Tq2 of the first outflow gas.

Although the temperature Tp1 of the sweep gas is not particularly limited, it is preferably 150° C. or higher and 450° C. or lower. By setting the temperature Tp1 of the sweep gas to 150° C. or higher, the relative humidity in the non-permeation side space 110A can be further reduced. By setting the temperature Tp1 of the sweep gas to 450° C. or less, a reduction in the durability of the separation membrane 3 can be suppressed.

The temperature Tp1 of the sweep gas is more preferably 160° C. or higher and 400° C. or lower. By setting the temperature Tp1 of the sweep gas to 160° C. or higher, the relative humidity in the non-permeation side space 110A can be further reduced. By setting the temperature Tp1 of the sweep gas to 400° C. or lower, the yield of the liquid fuel in the non-permeation side space 110A can be improved.

Although the temperature Tq1 of the raw material gas is not particularly limited, it is preferably 140° C. or higher and 350° C. or lower.

Liquid Fuel Synthesis Portion 110

Figure 2:
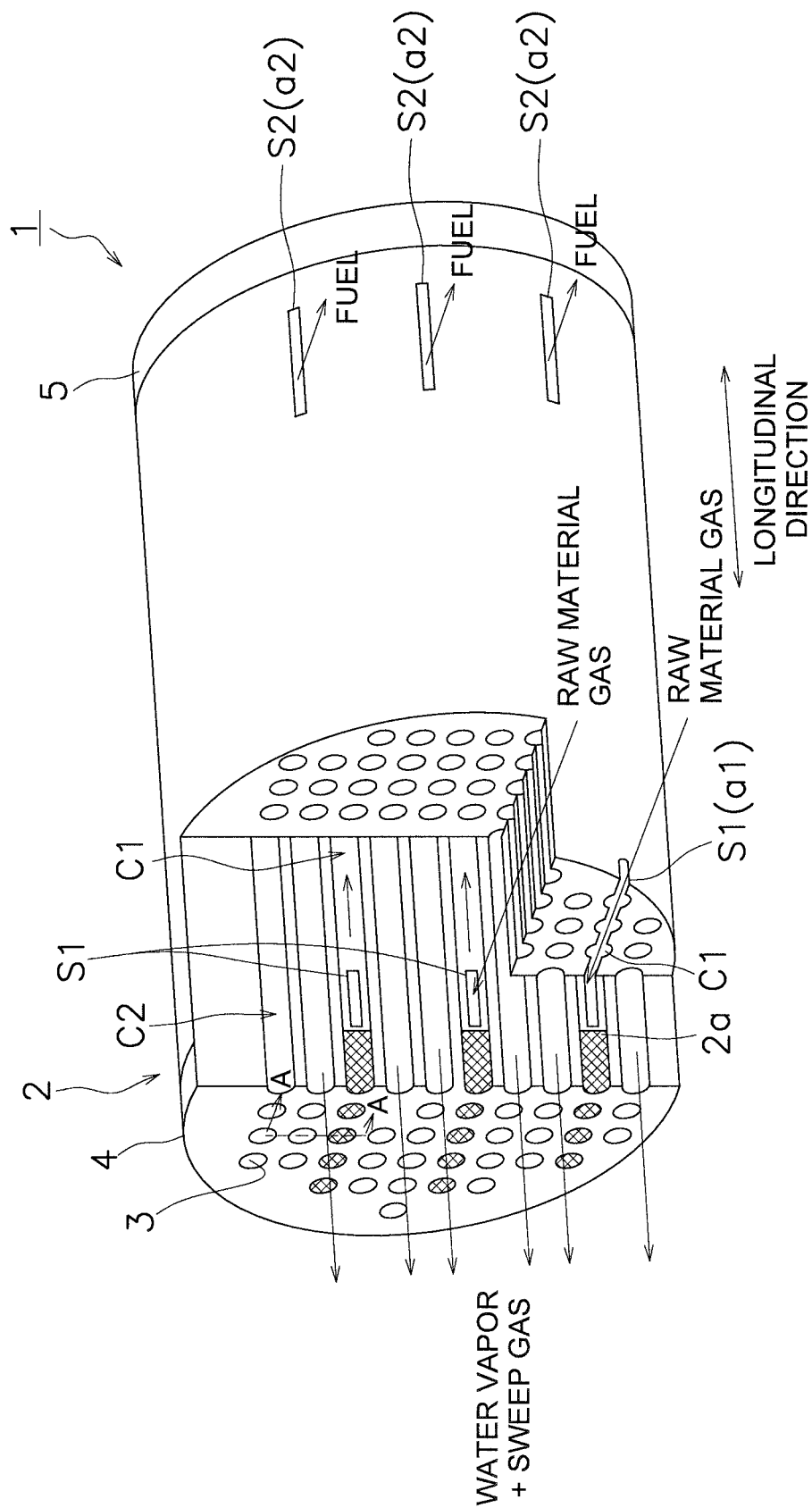
FIG. 2 is a perspective view of a membrane reactor according to the embodiment.

FIG. 2 is a perspective view of the liquid fuel synthesis portion 110. FIG. 2 partially shows a cross-sectional structure of the liquid fuel synthesis portion 110.

The liquid fuel synthesis portion 110 according to the present embodiment is a so-called membrane reactor.

The liquid fuel synthesis portion 110 has a porous substrate 2, a separation membrane 3, a first sealing portion 4, and a second sealing portion 5.

The porous substrate 2 has a monolithic shape extending in a longitudinal direction. The monolithic shape refers to a shape having a plurality of cells extending through the porous substrate 2 in the longitudinal direction, and conceptually includes a honeycomb shape.

Although the porous substrate 2 is formed in a columnar shape in the present embodiment, the shape of the porous substrate 2 is not particularly limited. Although the size of the porous substrate 2 is not particularly limited, it can have, for example, a length of 150 mm or more and 2000 mm or less and a width of 30 mm or more and 220 mm or less.

The porous substrate 2 has therein non-permeation side cells C1 arranged in three rows, permeation side cells C2 arranged in seven rows, three supply slits S1, and three discharge slits S2. In the present embodiment, an internal space of the non-permeation side cell C1 is the above-described non-permeation side space 110A, and an internal space of the permeation side cell C2 is the above-described permeation side space 110B.

Two ends in the longitudinal direction of each non-permeation side cell C1 are sealed by plugging portions 2a. Two ends in the longitudinal direction of each permeation side cell C2 are respectively open to the first sealing portion 4 and the second sealing portion 5. In the present embodiment, an opening formed in the second sealing portion 5 is the above-described inflow port b1, and an opening formed in the first sealing portion 4 is the above-described outflow port b2 (see FIG. 3).

Each supply slit S1 is formed to penetrate the non-permeation side cells C1 in each row. Each supply slit S1 is disposed on one end side of the porous substrate 2 in the longitudinal direction. Each discharge slit S2 is formed to penetrate the non-permeation side cells C1 in each row. Each discharge slit S2 is disposed on the other end side of the porous substrate 2 in the longitudinal direction. In the present embodiment, an opening of the supply slit S1 formed on a side surface of the porous substrate 2 is the above-described inflow port a1, and an opening of the discharge slit S2 formed on the side surface of the porous substrate 2 is the above-described outflow port a2.

The raw material gas is supplied to the non-permeation side cells C1 in each row through the supply slits S1. The raw material gas supplied to the non-permeation side cell C1 is converted into the liquid fuel by the catalyst contained in a catalyst layer 21 to be described later. The produced liquid fuel is discharged from the non-permeation side cells C1 in each row through the discharge slits S2.

The separation membrane 3 is formed on an inner surface of each permeation side cell C2. The separation membrane 3 is permeable to the water vapor which is a by-product of the conversion reaction. The separation membrane 3 preferably has a water vapor permeability coefficient of 1000 nmol/(s·Pa·m$^2$) or more. The greater the water vapor permeability coefficient is, the more water vapor generated in the catalyst layer 21 can be moved to the permeation side cell C2, and thus the reaction equilibrium of the above formulas (2) and (3) is shifted to the product side, and high reaction efficiency can be obtained under milder production conditions. The water vapor permeability coefficient can be determined using a known method (see Ind. Eng. Chem. Res., 40, 163-175 (2001)).

The separation membrane 3 is preferably impermeable to components other than water vapor (that is, hydrogen, carbon oxide, and liquid fuel). Specifically, the separation membrane 3 preferably has a separation factor of 1000 or more. The greater the separation factor is, the more permeable the separation membrane 3 is to water vapor, and less permeable to components other than water vapor. The separation factor can be determined using a known method (see FIG. 1 of "Separation and Purification Technology 239 (2020) 116533").

An inorganic membrane can be used as the separation membrane 3. The inorganic membrane is preferable because it has heat resistance, pressure resistance, and water vapor resistance. Examples of the inorganic membrane include a zeolite membrane, a silica membrane, an alumina membrane, and a composite membrane thereof. In particular, a zeolite membrane having a molar ratio (Si/Al) of a silicon element (Si) and an aluminum element (Al) of 50 or less is suitable because of its excellent water vapor permeability.

The water vapor permeating through the separation membrane 3 and flowing into the permeation side cell C2 is discharged from the outflow port b2 of the first sealing portion 4 together with the sweep gas flowing in from the inflow port b1 of the second sealing portion 5.

The first sealing portion 4 and the second sealing portion 5 cover two end surfaces of the porous substrate 2 so that the porous substrate 2 is not infiltrated by the water vapor discharged from the permeation side cell C2. However, the first sealing portion 4 and the second sealing portion 5 do not cover two ends of the permeation side cell C2. The first sealing portion 4 and the second sealing portion 5 can be made of glass, metal, rubber, resin, or the like.

Porous Substrate 2

Figure 3:
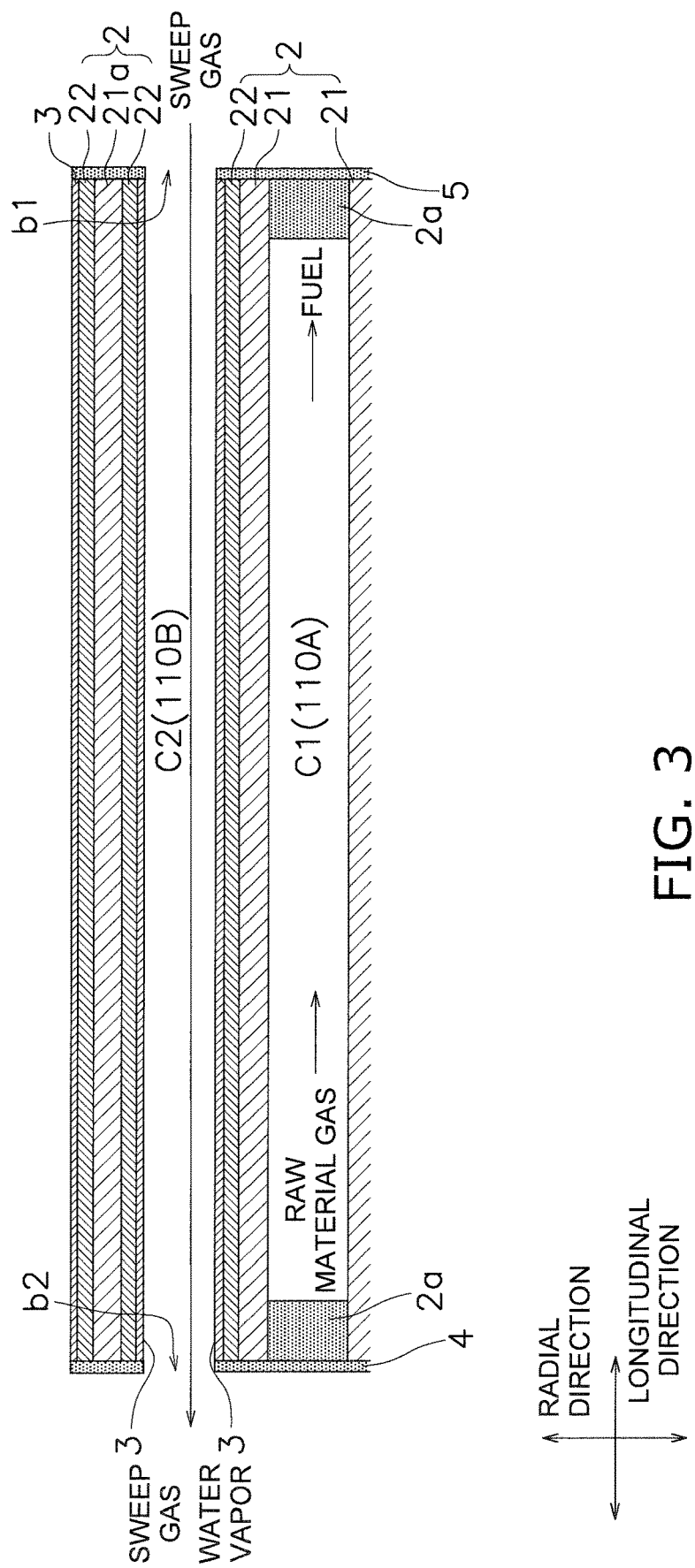
FIG. 3 is a cross-sectional view taken along line A-A in FIG. 2.

FIG. 3 is a cross-sectional view taken along line A-A in FIG. 2.

The porous substrate 2 supports the separation membrane 3. The porous substrate 2 has the catalyst layer 21 and a buffer layer 22. In the present embodiment, the catalyst layer 21 and the buffer layer 22 are disposed on the non-permeation side of the separation membrane 3.

The catalyst layer 21 is a porous body made of a porous material and the catalyst for promoting the conversion reaction described above.

An average pore diameter of the catalyst layer 21 can be 5 μm or more and 25 μm or less. The average pore diameter of the catalyst layer 21 can be measured using mercury intrusion porosimetry. The porosity of the catalyst layer 21 can be 25% or more and 50% or less. The average particle size of the porous material forming the catalyst layer 21 can be 1 μm or more and 100 μm or less. In the present embodiment, the average particle size is an arithmetic average value of maximum diameters of 30 particles (randomly selected) measured through cross-sectional microstructure observation using a Scanning Electron Microscope (SEM).

As the porous material, a ceramic material, a metal material, a resin material, or the like can be used, and the ceramic material is particularly suitable. As an aggregate of the ceramic material, alumina ($Al_2O_3$), titania ($TiO_2$), mullite ($Al_2O_3$—$SiO_2$), potsherd, cordierite ($Mg_2Al_4Si_5O_{18}$), or the like can be used, and alumina is preferable in consideration of availability, clay stability, and corrosion resistance. As an inorganic binder for the ceramic material, at least one of titania, mullite, readily sinterable alumina, silica, glass frit, a clay mineral, and readily sinterable cordierite can be used. However, the ceramic material does not need to contain an inorganic binder.

The catalyst promotes the conversion reaction of the raw material gas to the liquid fuel. The catalyst is disposed in pores of the porous material. The catalyst may be supported on inner surfaces of the pores. Alternatively, a carrier that supports the catalyst may adhere to the inner surfaces of the pores.

As the catalyst, a known catalyst suitable for the conversion reaction to a desired liquid fuel may be used. Specifically, metal catalysts (copper, palladium, and the like), oxide catalysts (zinc oxide, zirconia, gallium oxide, and the like), and composite catalysts thereof (copper-zinc oxide, copper-zinc oxide-alumina, copper-zinc oxide-chromium oxide-alumina, copper-cobalt-titania, catalysts obtained by modifying these with palladium, and the like) can be used.

The catalyst layer 21 is disposed between the non-permeation side cell C1 and the permeation side cell C2. On the other hand, a support layer 21a is disposed between the permeation side cells C2. The support layer 21a has a structure obtained by removing the catalyst from the catalyst layer 21.

The buffer layer 22 is disposed between the separation membrane 3 and the catalyst layer 21. The buffer layer 22 is provided to prevent the catalyst contained in the catalyst layer 21 from coming into direct contact with the separation membrane 3. By physically separating the catalyst from the separation membrane 3 using the buffer layer 22, even if the catalyst is heated by heat generated by a reaction, it is possible to suppress the occurrence of cracks starting from a contact point with the catalyst in the separation membrane 3.

The buffer layer 22 may be at least partially interposed between the separation membrane 3 and the catalyst layer 21, but is preferably interposed substantially in its entirety between the separation membrane 3 and the catalyst layer 21.

The buffer layer 22 is disposed on an inner surface of the catalyst layer 21. The buffer layer 22 is formed in a tubular shape. The buffer layer 22 also functions as a carrier (foundation layer) for the separation membrane 3.

The buffer layer 22 can be made of the same porous material as the catalyst layer 21, and the ceramic material is particularly suitable. At least one of alumina and titania is preferably used as the aggregate of the ceramic material. The buffer layer 22 may contain the same inorganic binder as the catalyst layer 21.

The average pore diameter of the buffer layer 22 is preferably smaller than the average pore diameter of the catalyst layer 21, and can be, for example, 0.001 μm or more and 2 μm or less. The average pore diameter of the buffer layer 22 can be measured using a Perm Porometer. The porosity of the buffer layer 22 can be 20% or more and 60% or less. The average particle size of the porous material forming the buffer layer 22 is preferably smaller than the average particle size of the porous material forming the catalyst layer 21, and can be, for example, 0.01 μm or more and 20 μm or less.

Manufacturing Method of Liquid Fuel Synthesis Portion 110

First, a monolithic porous molded body is formed by molding the porous material used for the catalyst layer 21 using an extrusion molding method, a press molding method, a cast molding method, or the like.

Subsequently, using a diamond cutting tool (a band saw, a disk cutter, a wire saw, or the like), a slit for the supply slit S1 and a slit for the discharge slit S2 are respectively formed on two end surfaces of the porous molded body.

Subsequently, after forming a molded body of the plugging portion 2a by filling a formed slit with the porous material, the porous molded body is fired (for example, 500° C. to 1500° C., 0.5 hours to 80 hours) to form a porous body.

Subsequently, a sintering aid, a pH adjuster, a surfactant, and the like are added to the porous material for the buffer layer 22 to prepare a slurry for the buffer layer.

Subsequently, while the slurry for the buffer layer is passed through a through-hole of the porous body, a molded body of the buffer layer 22 is formed on an inner surface of the through-hole using a filtration method.

Subsequently, the buffer layer 22 is formed by firing (for example, 500° C. to 1450° C., 0.5 hours to 80 hours) the molded body of the buffer layer 22.

Subsequently, the first sealing portion 4 and the second sealing portion 5 are formed by, for example, applying a glass raw material slurry to two end surfaces of the porous body and performing firing (for example, at 800° C. to 1000° C.).

Subsequently, a catalyst-containing slurry is prepared by mixing a catalyst for the catalyst layer 21 with an organic solvent, and the catalyst-containing slurry is impregnated into an inner surface of the non-permeation side cell C1 using the filtration method while supplying the catalyst-containing slurry from the supply slit S1. At this time, the impregnation depth of the catalyst-containing slurry is controlled by adjusting the viscosity using PVA or the like, so that the buffer layer 22 is not impregnated with the catalyst-containing slurry.

Subsequently, the catalyst is supported on the porous material by subjecting the porous body to heat treatment (for example, in a $N_2$ stream, 50° C. to 200° C., 0.5 hour to 80 hours) in an inert atmosphere. Thus, the catalyst layer 21 is formed.

Subsequently, the separation membrane 3 is formed on the inner surface of the buffer layer 22. As for a method of forming the separation membrane 3, a method corresponding to the type of the separation membrane 3 may be adopted as appropriate. For example, if the zeolite membrane is used as the separation membrane 3, a production method described in JP 2004-066188 A can be employed, and if the silica membrane is used as the separation membrane 3, a production method described in pamphlet WO 2008/050812 A can be employed.

Modification of Embodiment

Although an embodiment of the present invention has been described above, the present invention is not limited to the above embodiment, and various modifications can be made without departing from the gist of the invention.

Modification 1

Although the catalyst layer 21 is in direct contact with the buffer layer 22 in the above embodiment, one or more intermediate layers may be interposed between the catalyst layer 21 and the buffer layer 22.

The intermediate layer is made of a porous material that can be used for the catalyst layer 21. The average pore diameter of the intermediate layer is preferably smaller than the average pore diameter of the catalyst layer 21, and can be, for example, 0.005 μm or more and 5 μm or less. The average pore diameter of the intermediate layer can be measured using a Perm Porometer. The porosity of the intermediate layer can be, for example, 20% or more and 60% or less. The thickness of the intermediate layer can be, for example, 1 μm or more and 300 μm or less.

Modification 2

In the above embodiment, a case where the liquid fuel synthesis portion is monolithic has been described, but it is sufficient that the liquid fuel synthesis portion has at least a separation membrane permeable to the water vapor, and the non-permeation side space and the permeation side space that are partitioned by the separation membrane. The shape of the liquid fuel synthesis portion may be, for example, a flat plate shape, a tubular shape, a cylindrical shape (a so-called tube type), a columnar shape, a polygonal columnar shape, or the like. Even in this case, the liquid fuel synthesis portion includes a structure including the separation membrane, the non-permeation side space to which the raw material gas is supplied, and the permeation side space through which at least water vapor permeates.

For example, if a tubular liquid fuel synthesis portion is housed in a housing, the liquid fuel synthesis portion can include a tubular porous substrate, a separation membrane formed on an inner surface of the porous substrate, a first space inside the separation membrane, and a second space outside the separation membrane (a space between the separation membrane and the housing). If the raw material gas is supplied to the first space, the first space is the non-permeation side space and the second space is the permeation side space. If the raw material gas is supplied to the second space, the second space is the non-permeation side space and the first space is the permeation side space.

Modification 3

Although the configuration in which the porous substrate 2 is disposed on the non-permeation side of the separation membrane 3 has been described in the above embodiment, the present invention is not limited to this.

Figure 4:
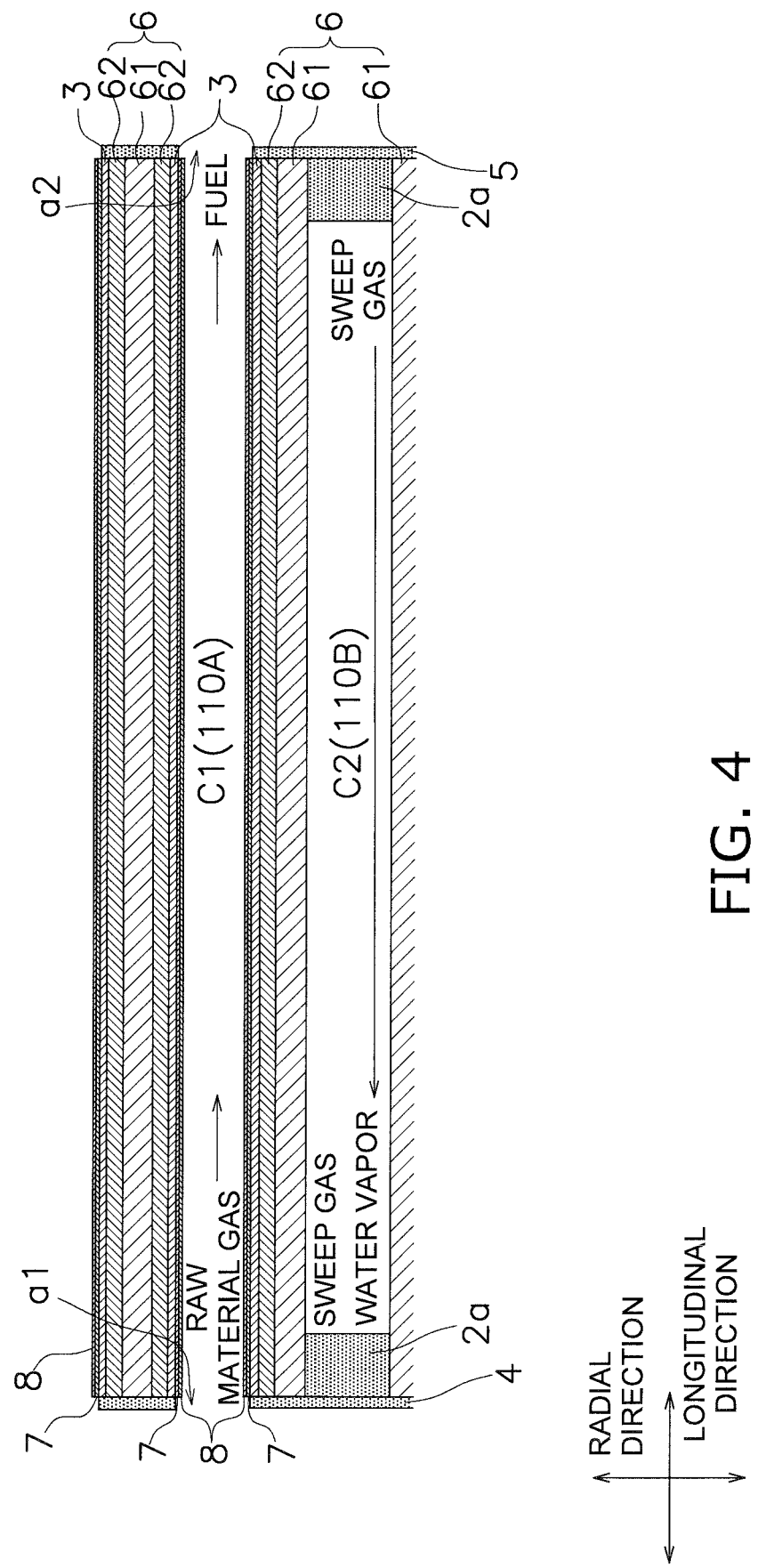
FIG. 4 is a cross-sectional view of the membrane reactor according to modification 3.

For example, as shown in FIG. 4, a porous substrate 6 may be disposed on the permeation side of the separation membrane 3, and a buffer layer 7 and a catalyst layer 8 may be arranged on the non-permeation side of the separation membrane 3.

In a configuration shown in FIG. 4, the inside of the catalyst layer 8 is the non-permeation side cell C1, and the inside of the porous substrate 6 is the permeation side cell C2. The raw material supplied to the non-permeation side cell C1 is converted into the liquid fuel in the catalyst layer 8, and the water vapor that is the by-product is produced. The produced water vapor permeates through the separation membrane 3, flows into the permeation side cell C2, and is discharged from the slits S1 and S2. Thus, a water vapor flow in this modification is opposite to a water vapor flow in the above embodiment.

The porous substrate 6 includes a support layer 61 and a surface layer 62. The support layer 61 has a structure obtained by removing the catalyst from the catalyst layer 21 according to the above embodiment. The surface layer 62 has the same structure as the buffer layer 22 according to the above embodiment.

The buffer layer 7 is disposed between the catalyst layer 8 and the separation membrane 3. The buffer layer 7 is provided to prevent the catalyst contained in the catalyst layer 8 from coming into direct contact with the separation membrane 3. By physically separating the catalyst from the separation membrane 3 by the buffer layer 7, even if the catalyst is heated by the heat generated by a reaction, it is possible to suppress the occurrence of cracks starting from the contact point with the catalyst in the separation membrane 3.

The buffer layer 7 can be made of a ceramic material or an organic polymeric material. Silica, alumina, chromia, or the like can be used as the ceramic material. PTFE, PVA, PEG, or the like can be used as the organic polymeric material.

The buffer layer 7 has a contact surface (not shown) that contacts the catalyst layer 8. The surface roughness Ra of the contact surface is preferably at least twice the average particle size of the catalyst. Thus, adhesion between the catalyst layer 8 and the buffer layer 7 can be improved. The average particle size of the catalyst is an arithmetic mean value of largest diameters of 30 catalyst particles (randomly selected) measured through microstructure observation using the SEM. The surface roughness Ra of the contact surface can be, for example, 1 μm or more and 20 μm or less.

The catalyst layer 8 contains a constituent material (ceramic material or organic polymeric material) of the buffer layer 7 and the catalyst for promoting the conversion reaction. Since the catalyst layer 8 contains the constituent material of the buffer layer 7, the adhesion between the catalyst layer 8 and the buffer layer 7 can be improved. However, the catalyst layer 8 does not need to contain the constituent material of the buffer layer 7. In this case, the catalyst layer 8 is composed only of the catalyst.

As the catalyst contained in the catalyst layer 8, the same catalyst as that contained in the catalyst layer 21 according to the above embodiment can be used.

The configuration shown in FIG. 4 is produced by forming up to the separation membrane 3 according to the production method described in the above embodiment (however, excluding a step of impregnating the catalyst-containing slurry), and then by sequentially forming the buffer layer 7 and the catalyst layer 8 on an inner surface of the separation membrane 3.

The buffer layer 7 can be formed by passing the slurry for the buffer layer obtained by mixing the ceramic material or the organic polymeric material and the organic solvent on the inner side of the separation membrane 3, and then by subjecting the slurry to heat treatment.

The catalyst layer 8 can be formed by passing a slurry for the catalyst layer obtained by mixing the constituent material (ceramic material or organic polymeric material) of the buffer layer 7, the catalyst, and the organic solvent inside the buffer layer 7, and then performing heat treatment in an inert atmosphere.

Modification 4

In the above embodiment, although the liquid fuel synthesis system 100 includes the liquid fuel synthesis portion 110 which is the membrane reactor, the present invention is not limited to this.

Figure 5:
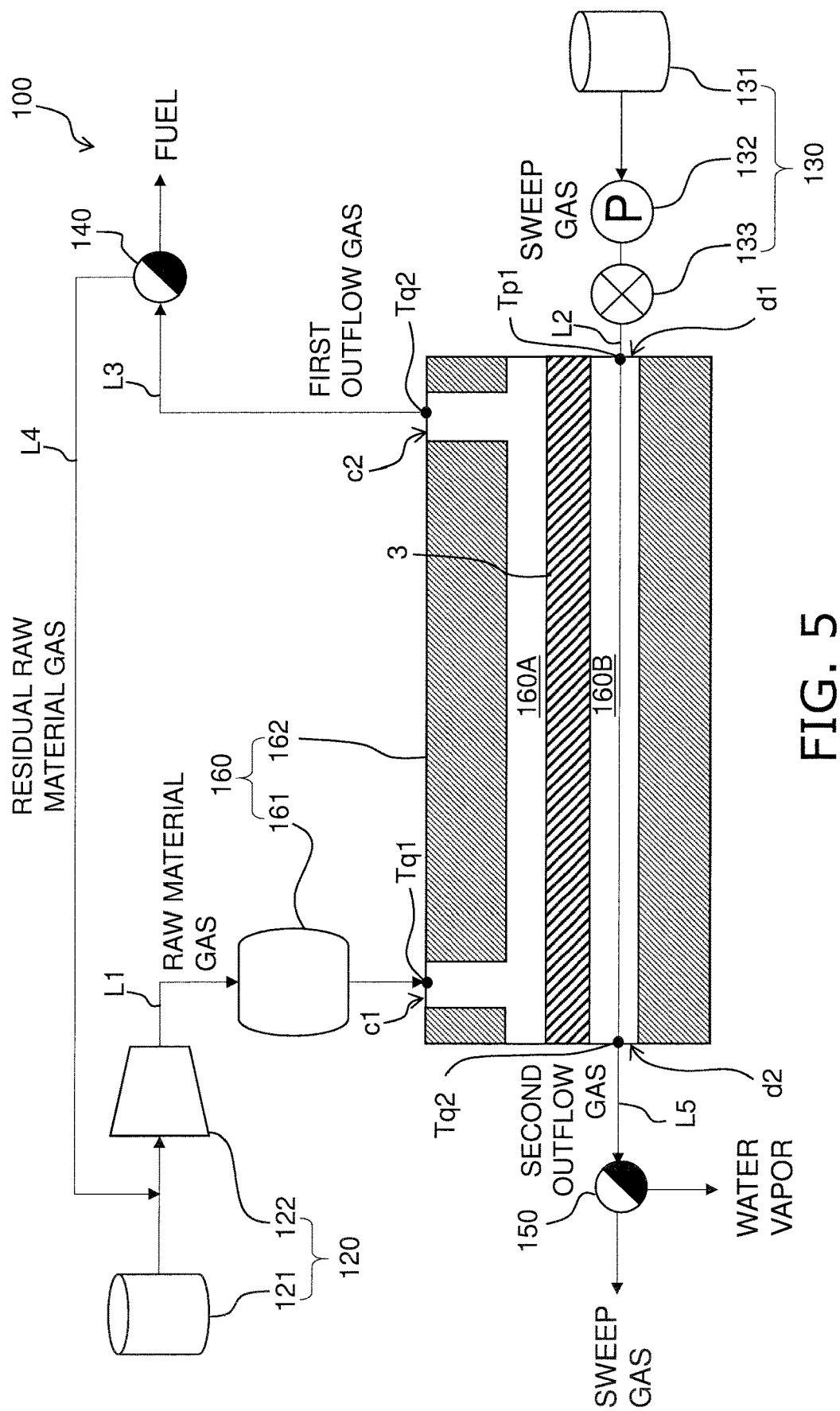
FIG. 5 is a schematic view showing the configuration of the liquid fuel synthesis system according to modification 4.

For example, as shown in FIG. 5, the liquid fuel synthesis system 100 may include a liquid fuel synthesis portion 160 having a catalyst unit 161 and a separation unit 162.

The raw material gas is supplied from the raw material gas supply unit 120 to the catalyst unit 161. The catalyst described in the above embodiment is disposed in the catalyst unit 161. The catalyst unit 161 converts the raw material gas to the liquid fuel.

The separation unit 162 has the separation membrane 3, a non-permeation side space 160A, and a permeation side space 160B.

The liquid fuel and the water vapor generated by the catalyst unit 161 flow into the non-permeation side space 160A through an inflow port c1. The liquid fuel that has not permeated through the separation membrane 3 flows out from the non-permeation side space 160A through an outflow port c2.

The water vapor passing through the separation membrane 3 flows into the permeation side space 160B. The sweep gas supplied from the sweep gas supply unit 130 flows into the permeation side space 160B through an inflow port d1. The second outflow gas containing the sweep gas and the water vapor flows out of the permeation side space 160B through an outflow port d2.

Also in this modification, the temperature Tp1 of the sweep gas flowing into the permeation side space 160B of the liquid fuel synthesis portion 160 is higher than at least one of the temperature Tq1 of the raw material gas flowing into the non-permeation side space 160A of the liquid fuel synthesis portion 160 and the temperature Tq2 of the first outflow gas flowing out of the non-permeation side space 160A of the liquid fuel synthesis portion 160. Further, the temperature Tp2 of the second outflow gas (containing the sweep gas and the water vapor) flowing out of the permeation side space 160B of the liquid fuel synthesis portion 160 is higher than at least one of the temperature Tq1 of the raw material gas flowing into the non-permeation side space 160A of the liquid fuel synthesis portion 160 and the temperature Tq2 of the first outflow gas flowing out of the non-permeation side space 160A of the liquid fuel synthesis portion 160. Thus, since the temperature of the permeation side space 160B can be kept high, a reduction in temperature can be suppressed even if the pressure of the water vapor permeating through the separation membrane 3 is reduced. Therefore, it is possible to suppress an increase in the relative humidity on the permeation side of the separation membrane 3, so that a reduction in the durability of the separation membrane 3 can be suppressed.

The temperature Tp1 of the sweep gas is obtained by the temperature measuring device disposed at the inflow port d1 of the permeation side space 160B. The temperature Tp2 of the second outflow gas is obtained by the temperature measuring device disposed at the outflow port d2 of the permeation side space 160B. The temperature Tq1 of the raw material gas is acquired by the temperature measuring device disposed at the inflow port a1 of the non-permeation side space 160A. The temperature Tq2 of the first outflow gas is obtained by the temperature measuring device disposed at the outflow port a2 of the non-permeation side space 160A.

Modification 5

In FIG. 1 according to the above-described embodiment and FIG. 5 according to the above-described modification 4, in a side view of the separation membrane 3, although a flow direction of the raw material gas flowing in the non-permeation side space is opposite to a flow direction of the sweep gas flowing in the permeation side space, the present invention is not limited to this. In the side view of the separation membrane 3, the flow direction of the raw material gas flowing in the non-permeation side space may be the same as (specifically, parallel to) the flow direction of the sweep gas flowing in the permeation side space.

Modification 6

In the above embodiment, although the separation membrane 3 is permeable to the water vapor which is the by-product of the conversion reaction of the raw material gas to the liquid fuel, the present invention is not limited to this. The separation membrane 3 may be permeable to the liquid fuel itself, which is a product of the conversion reaction of the raw material gas to the liquid fuel. Also in this case, the reaction equilibrium of the above formulas (2) and (3) can be shifted to the product side.

Here, the separation membrane 3 permeable to the liquid fuel may also be permeable to the water vapor which is the by-product of the conversion reaction.

Therefore, in this modification as well, the temperature Tp1 of the sweep gas and the temperature Tp2 of the second outflow gas (containing the sweep gas, the liquid fuel, and the water vapor) are each preferably higher than the lower temperature of the temperature Tq1 of the raw material gas and the temperature Tq2 of the first outflow gas (containing the residual raw material gas).

Thus, since the temperature of the permeation side space 110B can be kept high, a reduction in temperature can be suppressed even if the pressure of the water vapor permeating through the separation membrane 3 is reduced. Therefore, it is possible to suppress an increase in the relative humidity on the permeation side of the separation membrane 3, so that a reduction in the durability of the separation membrane 3 can be suppressed.

Modification 7

Figure 6:
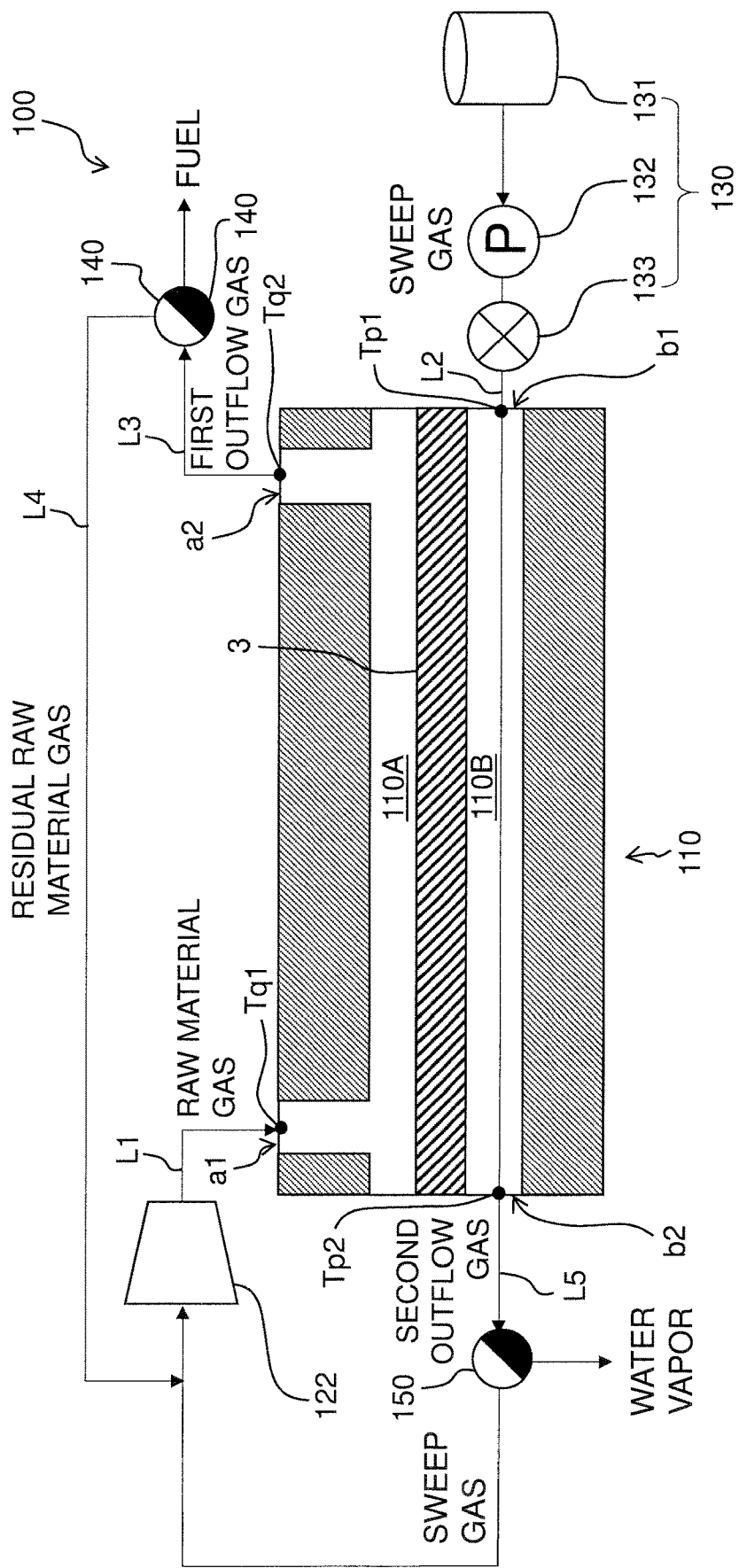
FIG. 6 is a schematic view showing the configuration of the liquid fuel synthesis system according to modification 7.

In the above embodiment, the nitrogen gas or air is used as the sweep gas, but a gas containing hydrogen or carbon dioxide as a main component may be used as the sweep gas. In this case, as shown in FIG. 6, the sweep gas separated in the second drain trap 150 can be used as the raw material gas. Thus, even if hydrogen contained in the raw material gas penetrates through the separation membrane 3 and is mixed into the sweep gas, it can be reused as the raw material gas, so that the utilization rate of the raw material gas can be improved.

Note that containing hydrogen or carbon dioxide being the main component means that the content ratio of hydrogen or carbon dioxide is the highest among gases contained in the sweep gas.

The sweep gas may contain only one of hydrogen and carbon dioxide, but may contain both hydrogen and carbon dioxide. If the sweep gas contains both hydrogen and carbon dioxide, since specific heat of the sweep gas can be increased compared to a case where the sweep gas contains only one of hydrogen and carbon dioxide, the removal efficiency of the heat generated along with the synthesis of the liquid fuel can be improved.

The sweep gas separated in the second drain trap 150 may be appropriately mixed with a material gas containing at least one of hydrogen and carbon dioxide. Thus, the sweep gas can be adjusted to have a composition suitable for the raw material gas.

The sweep gas preferably contains hydrogen as the main component. Thus, a difference between a hydrogen partial pressure in the non-permeation side space 110A and a hydrogen partial pressure in the permeation side space 110B can be reduced, so that the amount of hydrogen permeating through the separation membrane 3 can be suppressed. The content ratio of hydrogen in the sweep gas is not particularly limited, but can be, for example, 60 mol % or more and 100 mol % or less.

The sweep gas preferably contains carbon dioxide as a secondary component. Thus, it is possible to prevent a dew point (that is, humidity) of the second outflow gas from being reduced due to an excessive decrease in a ratio of an amount of exhaust gas to an amount of water in the exhaust gas. Containing carbon dioxide as the secondary component means that the content ratio of carbon dioxide in gases contained in the sweep gas is the second highest after hydrogen. The content ratio of carbon dioxide in the sweep gas is not particularly limited, but can be, for example, 5 mol % or more and 40 mol % or less.

Further, if the gas containing hydrogen or carbon dioxide as the main component is used as the sweep gas, at least part of the residual raw material gas separated in the first drain trap 140 may be used as the sweep gas.

Figure 7:
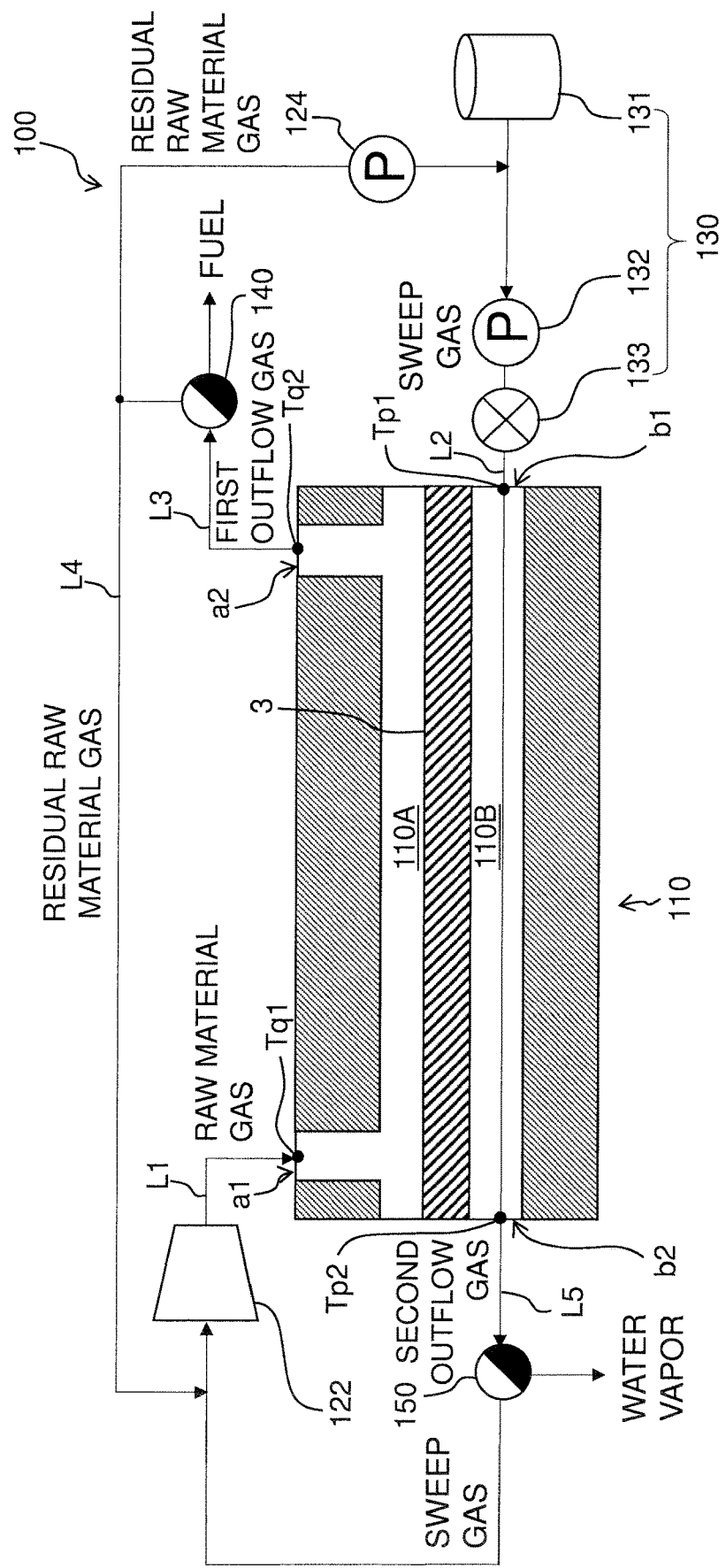
FIG. 7 is a schematic view showing the configuration of the liquid fuel synthesis system according to modification 7.

For example, as shown in FIG. 7, part of the residual raw material gas may be mixed with the sweep gas flowing out of the storage unit 131 and supplied to the pump 132. In this case, part of the residual raw material gas is used as part of the sweep gas. The mixing amount of the residual raw material gas can be adjusted by a pump 124.

Figure 8:
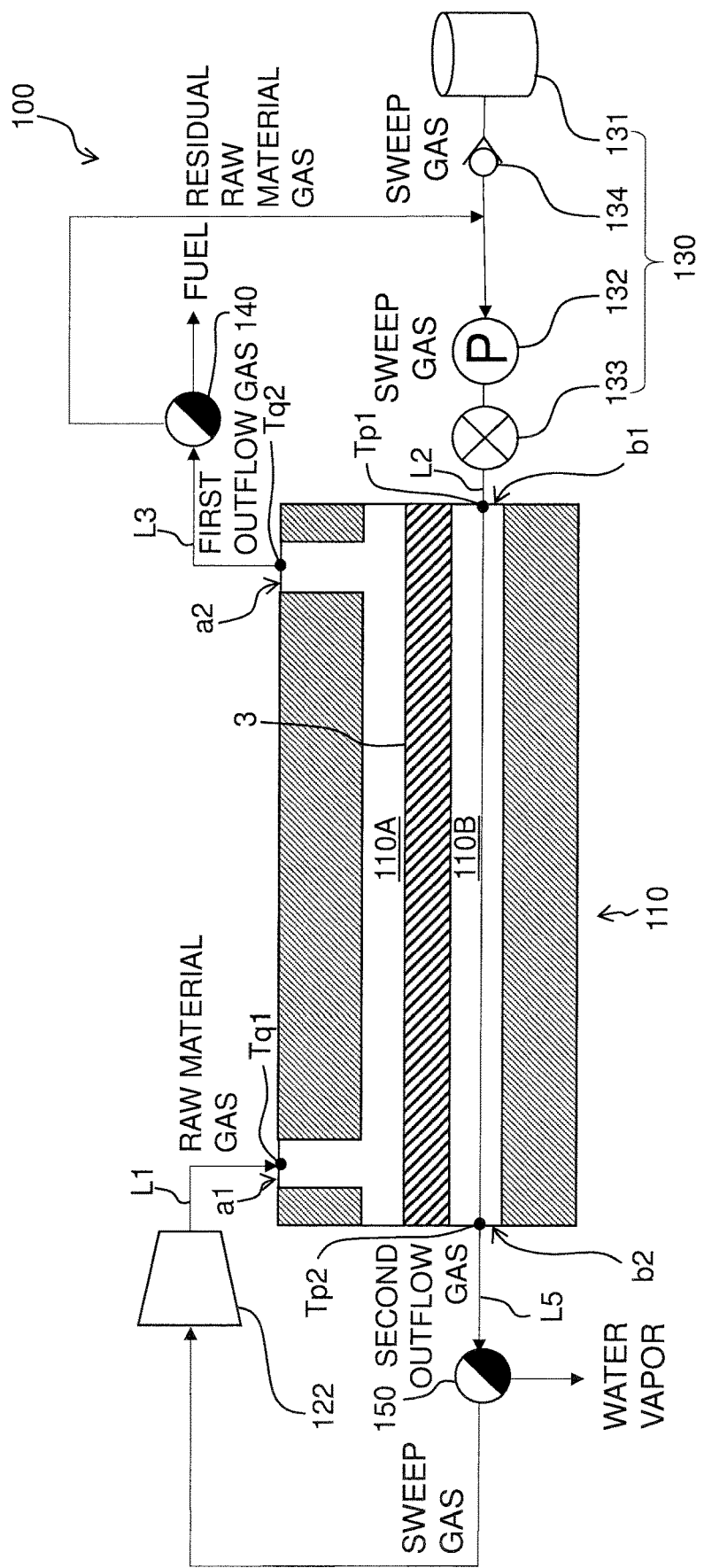
FIG. 8 is a schematic view showing the configuration of the liquid fuel synthesis system according to modification 7.

Alternatively, as shown in FIG. 8, all of the residual raw material gas may be mixed with the sweep gas flowing out of the storage unit 131 and supplied to the pump 132. The residual raw material gas flows toward the pump 132 because a check valve 134 restricts it from flowing toward the storage unit 131. In this case, all of the residual raw material gas is used as part of the sweep gas.

Figure 9:
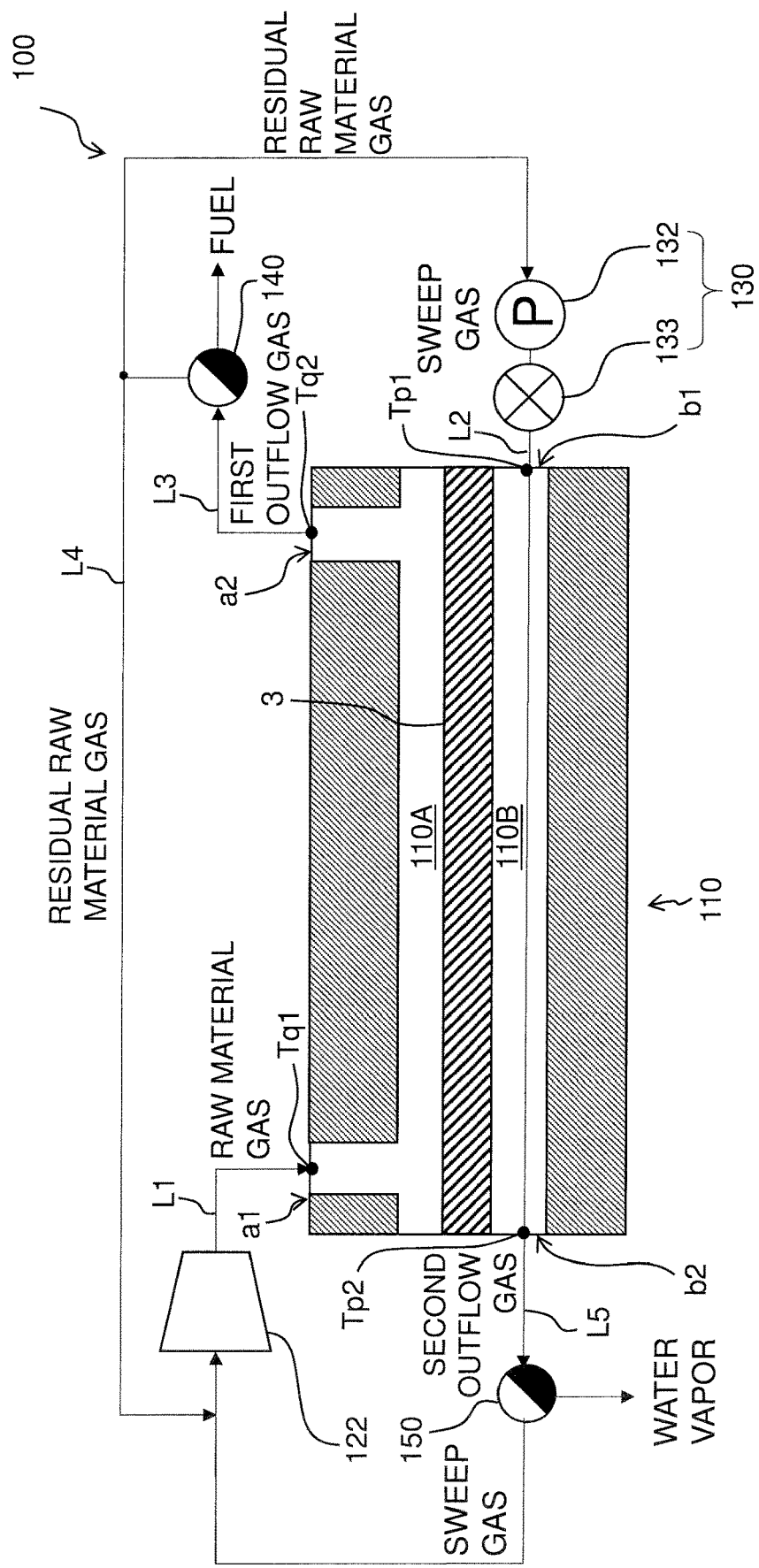
FIG. 9 is a schematic view showing the configuration of the liquid fuel synthesis system according to modification 7.

Alternatively, as shown in FIG. 9, the sweep gas supply unit 130 may not have the storage unit 131 and part of the residual raw material gas may be supplied to the pump 132. In this case, part of the residual raw material gas is used as it is as the sweep gas. A supply amount of the sweep gas (residual raw material gas) can be adjusted by the pump 132.

Figure 10:
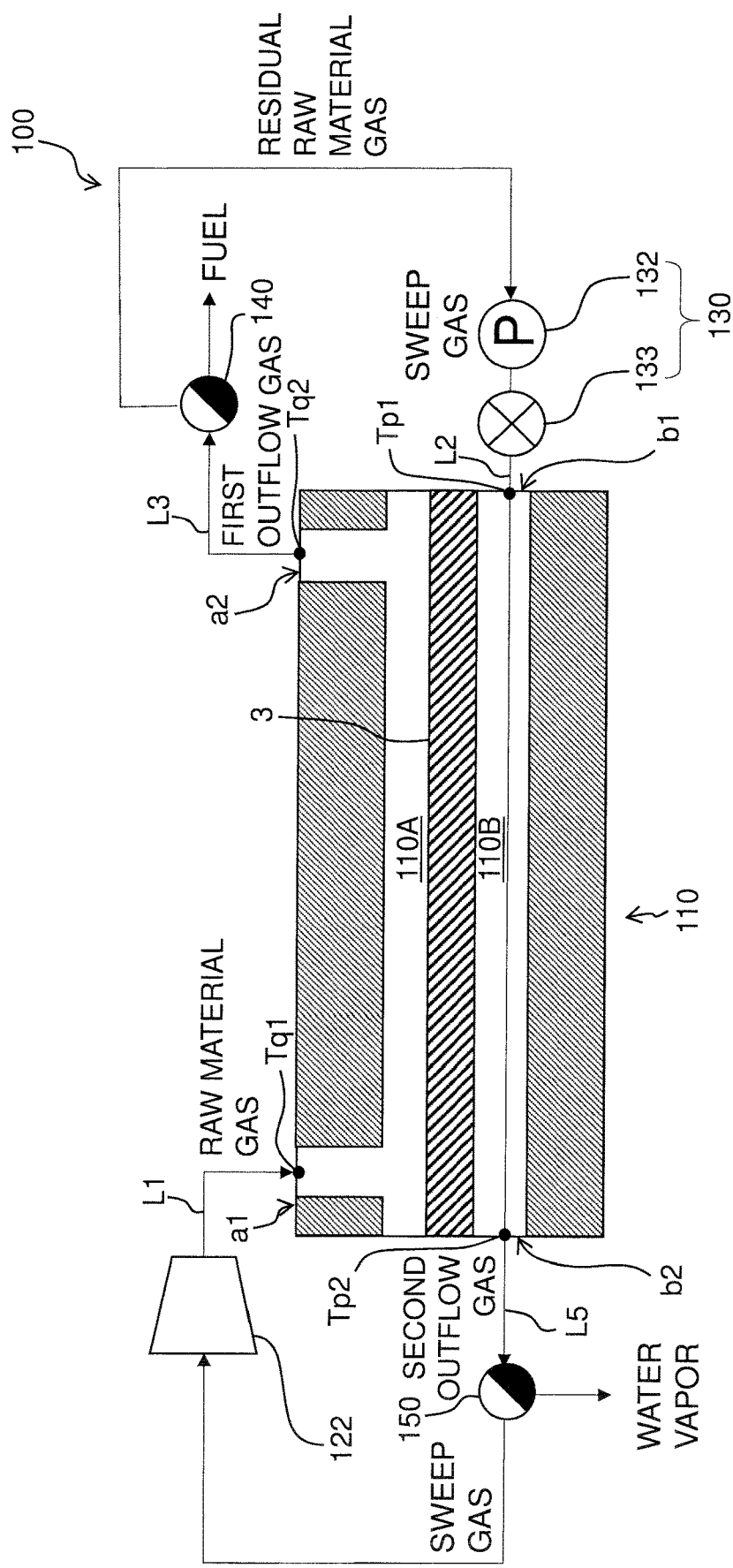
FIG. 10 is a schematic view showing the configuration of the liquid fuel synthesis system according to modification 7.

Alternatively, as shown in FIG. 10, the sweep gas supply unit 130 may not have the storage unit 131 and all of the residual raw material gas may be supplied to the pump 132. In this case, all of the residual raw material gas is used as it is as the sweep gas.

The invention claimed is:

1. A liquid fuel synthesis system comprising:
a liquid fuel synthesis portion having a separation membrane permeable to water vapor which is a by-product of a conversion reaction of a raw material gas containing hydrogen and carbon oxide to a liquid fuel, the liquid fuel synthesis portion being partitioned into a non-permeation side space and a permeation side space by the separation membrane; and
a sweep gas supply unit configured to supply the permeation side space with a sweep gas for sweeping the water vapor permeating through the separation membrane; wherein
a temperature of the sweep gas flowing into the permeation side space is higher than at least one of the temperature of the raw material gas flowing into the non-permeation side space and the temperature of a first outflow gas flowing out of the non-permeation side space, and
a temperature of a second outflow gas flowing out of the permeation side space is higher than at least one of the temperature of the raw material gas flowing into the non-permeation side space and the temperature of the first outflow gas flowing out of the non-permeation side space.

2. The liquid fuel synthesis system according to claim 1, wherein the temperature of the sweep gas flowing into the permeation side space is 150° C. or higher and 450° C. or lower.

3. The liquid fuel synthesis system according to claim 1, wherein the temperature of the sweep gas flowing into the permeation side space is 160° C. or higher and 400° C. or lower.

4. The liquid fuel synthesis system according to claim 1, wherein the temperature of the raw material gas flowing into the non-permeation side space is 140° C. or higher and 350° C. or lower.

5. A liquid fuel synthesis system comprising:
- a liquid fuel synthesis portion having a separation membrane permeable to a liquid fuel which is a product of a conversion reaction of a raw material gas containing hydrogen and carbon oxide to the liquid fuel, and water vapor which is a by-product of the conversion reaction, the liquid fuel synthesis portion being partitioned into a non-permeation side space and a permeation side space by the separation membrane; and
- a sweep gas supply unit configured to supply the permeation side space with a sweep gas for sweeping the liquid fuel permeating through the separation membrane; wherein
- a temperature of the sweep gas flowing into the permeation side space is higher than at least one of a temperature of the raw material gas flowing into the non-permeation side space and a temperature of a first outflow gas flowing out of the non-permeation side space, and
- a temperature of a second outflow gas flowing out of the permeation side space is higher than at least one of the temperature of the raw material gas flowing into the non-permeation side space and the temperature of the first outflow gas flowing out of the non-permeation side space.

6. The liquid fuel synthesis system according to claim 5, wherein the temperature of the sweep gas flowing into the permeation side space is 150° C. or higher and 450° C. or lower.

7. The liquid fuel synthesis system according to claim 5, wherein the temperature of the sweep gas flowing into the permeation side space is 160° C. or higher and 400° C. or lower.

8. The liquid fuel synthesis system according to claim 5, wherein the temperature of the raw material gas flowing into the non-permeation side space is 140° C. or higher and 350° C. or lower.

* * * * *